United States Patent
Xiao et al.

(10) Patent No.: US 10,991,946 B2
(45) Date of Patent: *Apr. 27, 2021

(54) POLYMERIZATION PROCESS FOR FORMING POLYMERIC ULTRATHIN CONFORMAL COATINGS ON ELECTRODE MATERIALS

(71) Applicant: GM GLOBAL TECHNOLOGY OPERATIONS LLC, Detroit, MI (US)

(72) Inventors: Xingcheng Xiao, Troy, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/513,303

(22) Filed: Jul. 16, 2019

(65) Prior Publication Data

US 2019/0341615 A1 Nov. 7, 2019

Related U.S. Application Data

(63) Continuation of application No. 15/160,377, filed on May 20, 2016, now Pat. No. 10,396,360.

(51) Int. Cl.
*H01M 4/04* (2006.01)
*H01M 10/0525* (2010.01)
(Continued)

(52) U.S. Cl.
CPC .......... *H01M 4/62* (2013.01); *H01M 4/0423* (2013.01); *H01M 4/134* (2013.01);
(Continued)

(58) Field of Classification Search
None
See application file for complete search history.

(56) References Cited

U.S. PATENT DOCUMENTS 6,451,487 B1 9/2002 Besner et al.
7,018,607 B2 3/2006 Nazri et al.
(Continued)

FOREIGN PATENT DOCUMENTS

CN 1658411 A 8/2005
CN 101107746 A 1/2008
(Continued)

OTHER PUBLICATIONS

Aurbach, Doron, et al., "Design of electrolyte solutions for Li and Li-ion batteries: a review," Electrochimica Acta, vol. 50, pp. 247-254 (2004) (published online Aug. 3, 2004).

(Continued)

*Primary Examiner* — Maria Laios
(74) *Attorney, Agent, or Firm* — Harness, Dickey & Pierce, P.L.C.

(57) ABSTRACT

An electroactive material for use in an electrochemical cell, like a lithium ion battery, is provided. The electroactive material comprises silicon or tin and undergoes substantial expansion during operation of a lithium ion battery. A polymeric ultrathin conformal coating is formed over a surface of the electroactive material. The coating is flexible and is capable of reversibly elongating by at least 250% from a contracted state to an expanded state in at least one direction to minimize or prevent fracturing of the negative electrode material during lithium ion cycling. The coating may be applied by vapor precursors reacting in atomic layer deposition (ALD) to form conformal ultrathin layers over the electroactive materials. Methods for making such materials and using such materials in electrochemical cells are likewise provided.

20 Claims, 5 Drawing Sheets

(51) Int. Cl.
*H01M 4/62* (2006.01)
*H01M 4/134* (2010.01)
*H01M 4/1395* (2010.01)
*H01M 4/38* (2006.01)
*H01M 4/36* (2006.01)
*H01M 4/02* (2006.01)

(52) U.S. Cl.
CPC ......... *H01M 4/1395* (2013.01); *H01M 4/366* (2013.01); *H01M 4/386* (2013.01); *H01M 4/387* (2013.01); *H01M 4/628* (2013.01); *H01M 10/0525* (2013.01); *H01M 2004/027* (2013.01); *H01M 2220/20* (2013.01); *Y02E 60/10* (2013.01); *Y02P 70/50* (2015.11)

(56) References Cited

U.S. PATENT DOCUMENTS

| | | |
|---|---|---|
| 7,285,260 B2 | 10/2007 | Armand et al. |
| 7,457,018 B2 | 11/2008 | Armand et al. |
| 7,491,467 B2 | 2/2009 | Satoh et al. |
| 7,651,732 B2 | 1/2010 | Cheng et al. |
| 7,722,994 B2 | 5/2010 | Halalay |
| 7,736,805 B2 | 6/2010 | Nazri et al. |
| 8,076,027 B2 | 12/2011 | Honda et al. |
| 8,101,152 B1 | 1/2012 | Halalay et al. |
| 8,148,455 B2 | 4/2012 | Posudievsky et al. |
| 8,247,116 B2 | 8/2012 | He et al. |
| 8,309,644 B1 | 11/2012 | Huang |
| 8,399,138 B2 | 3/2013 | Timmons |
| 8,420,259 B2 | 4/2013 | Xiao et al. |
| 8,440,350 B1 | 5/2013 | Verbrugge et al. |
| 8,455,140 B1 | 6/2013 | Huang et al. |
| 8,460,591 B2 | 6/2013 | Huang et al. |
| 8,460,829 B1 | 6/2013 | Huang et al. |
| 8,470,468 B2 | 6/2013 | Xiao et al. |
| 8,470,898 B2 | 6/2013 | Huang |
| 8,641,860 B2 | 2/2014 | Flores et al. |
| 8,642,201 B2 | 2/2014 | Cheng et al. |
| 8,658,295 B2 | 2/2014 | Cheng et al. |
| 8,679,680 B2 | 3/2014 | Vanimisetti et al. |
| 8,753,543 B2 | 6/2014 | Zhamu et al. |
| 8,828,481 B2 | 9/2014 | Burton et al. |
| 8,835,056 B2 | 9/2014 | Xiao et al. |
| 8,974,946 B2 | 3/2015 | Cai et al. |
| 8,999,584 B2 | 4/2015 | Jiang et al. |
| 9,012,075 B2 | 4/2015 | Verbrugge et al. |
| 9,034,519 B2 | 5/2015 | Xiao et al. |
| 9,059,451 B2 | 6/2015 | Xiao et al. |
| 9,093,705 B2 | 7/2015 | Xiao et al. |
| 9,123,939 B2 | 9/2015 | Xiao et al. |
| 9,142,830 B2 | 9/2015 | Xiao et al. |
| 9,153,819 B2 | 10/2015 | Huang et al. |
| 9,160,036 B2 | 10/2015 | Yang et al. |
| 9,356,281 B2 | 5/2016 | Verbrugge et al. |
| 9,362,551 B2 | 6/2016 | Sachdev et al. |
| 9,362,552 B2 | 6/2016 | Sohn et al. |
| 9,379,374 B2 | 6/2016 | Liu et al. |
| 9,531,004 B2 | 12/2016 | Xiao et al. |
| 9,564,639 B2 | 2/2017 | Huang |
| 9,947,915 B2 | 4/2018 | Kim et al. |
| 10,164,245 B2 | 12/2018 | Huang |
| 10,396,360 B2 * | 8/2019 | Xiao .................. H01M 4/386 |
| 2005/0191556 A1 | 9/2005 | Kim et al. |
| 2005/0214644 A1 | 9/2005 | Aramata et al. |
| 2006/0147797 A1 | 7/2006 | Wu et al. |
| 2007/0099086 A1 | 5/2007 | Kang et al. |
| 2007/0202411 A1 | 8/2007 | Kim et al. |
| 2007/0238023 A1 | 10/2007 | Gorshkov et al. |
| 2007/0275302 A1 | 11/2007 | Sotowa et al. |
| 2008/0063939 A1 | 3/2008 | Ryu et al. |
| 2008/0226987 A1 | 9/2008 | Yumoto et al. |
| 2008/0261116 A1 | 10/2008 | Burton et al. |
| 2009/0111031 A1 | 4/2009 | Hirose et al. |
| 2009/0136415 A1 | 5/2009 | Gorshkov et al. |
| 2009/0140742 A1 | 6/2009 | Koch et al. |
| 2009/0155697 A1 | 6/2009 | Park et al. |
| 2009/0253042 A1 | 10/2009 | Sun et al. |
| 2009/0286157 A1 | 11/2009 | Chen et al. |
| 2009/0325071 A1 | 12/2009 | Verbrugge et al. |
| 2010/0079145 A1 | 4/2010 | Meisner et al. |
| 2010/0143790 A1 | 6/2010 | Inagaki et al. |
| 2010/0203392 A1 | 8/2010 | Yamada et al. |
| 2010/0272612 A1 | 10/2010 | Ramamurthy |
| 2010/0330421 A1 | 12/2010 | Cui et al. |
| 2011/0017528 A1 | 1/2011 | Kumar et al. |
| 2011/0027649 A1 | 2/2011 | Abe |
| 2011/0037436 A1 | 2/2011 | Seethaler et al. |
| 2011/0044886 A1 | 2/2011 | Gorshkov et al. |
| 2011/0086249 A1 | 4/2011 | Timmons |
| 2011/0086294 A1 | 4/2011 | Xiao et al. |
| 2011/0111294 A1 | 5/2011 | Lopez et al. |
| 2011/0111308 A1 | 5/2011 | Halalay et al. |
| 2011/0121225 A1 | 5/2011 | Posudievslcy et al. |
| 2011/0151333 A1 | 6/2011 | Halalay et al. |
| 2011/0165459 A1 | 7/2011 | Halalay et al. |
| 2011/0166811 A1 | 7/2011 | Koch et al. |
| 2011/0189577 A1 | 8/2011 | Chung et al. |
| 2011/0200781 A1 | 8/2011 | Sowul et al. |
| 2011/0200863 A1 | 8/2011 | Xiao et al. |
| 2011/0224928 A1 | 9/2011 | Lin et al. |
| 2011/0250478 A1 | 10/2011 | Timmons et al. |
| 2011/0274962 A1 | 11/2011 | Inagaki et al. |
| 2012/0003533 A1 | 1/2012 | Dahn et al. |
| 2012/0086457 A1 | 4/2012 | Meisner et al. |
| 2012/0100403 A1 | 4/2012 | Wang et al. |
| 2012/0101674 A1 | 4/2012 | Wang et al. |
| 2012/0105068 A1 | 5/2012 | Wang et al. |
| 2012/0105069 A1 | 5/2012 | Wang et al. |
| 2012/0109503 A1 | 5/2012 | Yang et al. |
| 2012/0156568 A1 | 6/2012 | Kia et al. |
| 2012/0156569 A1 | 6/2012 | Kia et al. |
| 2012/0161757 A1 | 6/2012 | Koch et al. |
| 2012/0161776 A1 | 6/2012 | Koch et al. |
| 2012/0169297 A1 | 7/2012 | Schaefer et al. |
| 2012/0196183 A1 | 8/2012 | Chiga et al. |
| 2012/0208087 A1 | 8/2012 | Yamamoto et al. |
| 2012/0219852 A1 | 8/2012 | Huang et al. |
| 2012/0227252 A1 | 9/2012 | Nazri |
| 2012/0229096 A1 | 9/2012 | Nazri |
| 2012/0231321 A1 | 9/2012 | Huang et al. |
| 2012/0244390 A1 | 9/2012 | Cheng et al. |
| 2012/0244418 A1 | 9/2012 | Cheng et al. |
| 2012/0264017 A1 | 10/2012 | Nazri et al. |
| 2012/0301790 A1 | 11/2012 | Xiao et al. |
| 2012/0308853 A1 | 12/2012 | Vanimisetti et al. |
| 2012/0308872 A1 | 12/2012 | Huang |
| 2012/0328927 A1 | 12/2012 | Timmons et al. |
| 2013/0071736 A1 | 3/2013 | Xiao et al. |
| 2013/0071742 A1 | 3/2013 | Halalay et al. |
| 2013/0099159 A1 | 4/2013 | Halalay et al. |
| 2013/0122374 A1 | 5/2013 | Verbrugge et al. |
| 2013/0131200 A1 | 5/2013 | Huang |
| 2013/0157125 A1 | 6/2013 | Sachdev et al. |
| 2013/0175998 A1 | 7/2013 | Wang et al. |
| 2013/0177804 A1 | 7/2013 | Verbrugge et al. |
| 2013/0177808 A1 | 7/2013 | Wang et al. |
| 2013/0183582 A1 | 7/2013 | Flabby et al. |
| 2013/0189576 A1 | 7/2013 | Verbrugge et al. |
| 2013/0224602 A1 | 8/2013 | Huang |
| 2013/0234674 A1 | 9/2013 | Nazri |
| 2013/0284338 A1 | 10/2013 | Xiao et al. |
| 2013/0319599 A1 | 12/2013 | Huang |
| 2013/0323595 A1 | 12/2013 | Sohn et al. |
| 2014/0011089 A1 | 1/2014 | Yamada et al. |
| 2014/0023931 A1 | 1/2014 | Huang |
| 2014/0038024 A1 | 2/2014 | Huang |
| 2014/0113197 A1 | 4/2014 | Xiao et al. |
| 2014/0205905 A1 | 7/2014 | Xiao et al. |
| 2014/0265557 A1 | 9/2014 | Huang et al. |
| 2014/0272526 A1 | 9/2014 | Huang |
| 2014/0272558 A1 | 9/2014 | Xiao et al. |
| 2014/0272569 A1 | 9/2014 | Cai et al. |
| 2014/0272573 A1 | 9/2014 | Xiao et al. |

(56) References Cited

U.S. PATENT DOCUMENTS

| | | |
|---|---|---|
| 2014/0272578 A1 | 9/2014 | Xiao et al. |
| 2014/0272584 A1 | 9/2014 | Jiang et al. |
| 2014/0272603 A1 | 9/2014 | Yang et al. |
| 2015/0014890 A1 | 1/2015 | Xiao |
| 2015/0037651 A1 | 2/2015 | Huang |
| 2015/0162602 A1 | 6/2015 | Dadheech et al. |
| 2015/0180023 A1 | 6/2015 | Xiao et al. |
| 2015/0228980 A1 | 8/2015 | Huang |
| 2016/0093879 A1 | 3/2016 | Song et al. |
| 2017/0092950 A1 | 3/2017 | Xiao et al. |
| 2017/0338490 A1 | 11/2017 | Xiao et al. |
| 2018/0076461 A1 | 3/2018 | Yamada et al. |

FOREIGN PATENT DOCUMENTS

| | | |
|---|---|---|
| CN | 101385163 A | 3/2009 |
| CN | 101728517 A | 6/2010 |
| CN | 101764209 A | 6/2010 |
| CN | 101986442 A | 3/2011 |
| CN | 102306748 A | 1/2012 |
| CN | 102760881 A | 10/2012 |
| CN | 103779550 A | 5/2014 |
| CN | 103943819 A | 7/2014 |
| CN | 103996835 A | 8/2014 |
| CN | 104701487 A | 6/2015 |
| CN | 107403910 A | 11/2017 |
| CN | 107845772 A | 3/2018 |
| DE | 102013220351 A1 | 4/2014 |
| DE | 102014118089 A1 | 6/2015 |
| DE | 102017110902 A1 | 11/2017 |
| DE | 102017121250 A1 | 3/2018 |
| FR | 2965408 A1 | 3/2012 |
| JP | 2007234255 A | 9/2007 |
| WO | 2007094635 A1 | 8/2007 |
| WO | 2012109218 A2 | 8/2012 |
| WO | 2012132396 A1 | 10/2012 |
| WO | 2014022986 A1 | 2/2014 |
| WO | 2014182281 A1 | 11/2014 |
| WO | 2015176241 A1 | 11/2015 |

OTHER PUBLICATIONS

Bai, Ying, et al., "Microstructure and electrochemical performances of LiF-coated spinel LiMn2O4," Transactions of Nonferrous Metals Society of China, vol. 17, pp. s892-s896 (2007).

Franssila, Sami, Introduction to Microfabrication, Second Ed., p. 53 (2010).

Gaines, Linda, et al., "Costs of Lithium-Ion Batteries for Vehicles," Argonne National Laboratory, Center for Transportation Research (May 2000).

George, Steven M., "Atomic Layer Deposition: An Overview," Chem. Rev., vol. 110, No. 1, pp. 111-131 (2010) (published online Nov. 30, 2009).

Goldstein, David N., et al., "Al2O3 Atomic Layer Deposition with Trimethylaluminum and Ozone Studied by in Situ Transmission FTIR Spectroscopy and Quadrupole Mass Spectrometry," J. Phys. Chem. C, vol. 112, No. 49, pp. 19530-19539 (2008) (published online Nov. 13, 2008).

Huntsman Corporation, Jeffamine® ED-2003 Polyetheramine Technical Bulletin, Form 5197-0208 (2007) (2 pages).

Lee, Won-Jun, et al., "A Comparative Study on the Si Precursors for the Atomic Layer Deposition of Silicon Nitride Thin Films," Journal of the Korean Physical Society, vol. 45, No. 5, pp. 1352-1355 (Nov. 2004).

Leskela, Markku, et al., "Atomic layer deposition (ALD): from precursors to thin film structures," Thin Solid Films, vol. 409, pp. 138-146 (2002).

Mavri, Andraž et al. "Molecular size and solubility conditions of polysilane macromolecules with different topology" Scientific Reports, 6, 35450 (Oct. 17, 2016); doi:0.1038/srep35450.

Nikkei Electronics, "New Anode Material Could Boost Lithium Battery Performance by 30 Percent," available at http://www.greentechmedia.com/articles/read/new-anode-material-could-boost-lithium-battery-performance-by-30-percent (Nov. 2, 2010) (2 pages).

Qin, Yan, et al., "Mechanism of LTO Gassing and potential solutions," Argonne National Laboratory Presentation, May 9-13, 2011 (18 pages).

Ramadass, Premanand, et al., "Mathematical Modeling of SEI Formation in Li-Ion Cell Anodes," 202nd Meeting of the Electrochemical Society—Salt Lake City, UT, Oct. 20-25, 2002, (Abstract) (10 pages) (Oct. 23, 2002).

Vetter, J., et al., "Ageing mechanisms in lithium-ion batteries," J. Power Sources, vol. 147, Nos. 1-2, pp. 269-281 (Sep. 9, 2005).

Xiao, Xingcheng et al.; "Ultrathin Multifunctional Oxide Coatings for Lithium Ion Batteries"; Advanced Materials, vol. 23, No. 34; Jul. 22, 2011; pp. 3911-3915.

Xu, Zheng-Long et al.; "Electrospun Carbon Nanofiber Anodes Containing Monodispersed Si Nanoparticles and Graphene Oxide with Exceptional High Rate Capacities"; Nano Energy, vol. 6; May 2014; pp. 27-35.

Yoon Seok Jung et al.; "Ultrathin Direct Atomic Layer Deposition on Composite Electrodes for Highly Durable and Safe Li-Ion Batteries"; Advanced Materials, vol. 22, No. 19; Apr. 6, 2010; pp. 2172-2176.

First Office Action for Chinese Patent Application No. 201410017174.9 dated Oct. 10, 2015 with correspondence dated Oct. 19, 2015 from China Patent Agent (H.K.) Ltd. summarizing contents; 12 pages.

First Office Action for Chinese Patent Application No. 201310489603.8 dated Jul. 17, 2015 with correspondence dated Jul. 31, 2015 from China Patent Agent (H.K.) Ltd. summarizing contents; 12 pages.

First Office Action for Chinese Patent Application No. 201410750591.4 dated Jul. 5, 2016 with correspondence dated Jul. 15, 2016 from China Patent Agent (H.K.) Ltd. summarizing contents; 9 pages.

Second Office Action for Chinese Patent Application No. 201310489603.8 dated Apr. 15, 2016 with correspondence dated May 22, 2016 from China Patent Agent (H.K.) Ltd. summarizing contents; 10 pages.

Second Office Action for Chinese Patent Application No. 201410017174.9 dated Aug. 3, 2016 with correspondence dated Aug. 17, 2016 from China Patent Agent (H.K.) Ltd. summarizing contents; 15 pages.

First Office Action for Chinese Patent Application No. 201710321915.6 dated Jan. 2, 2020 with English language machine translation, 13 pages.

\* cited by examiner

POLYMERIZATION PROCESS FOR FORMING POLYMERIC ULTRATHIN CONFORMAL COATINGS ON ELECTRODE MATERIALS

CROSS-REFERENCE TO RELATED APPLICATIONS

This application is a continuation of U.S. patent application Ser. No. 15/160,377 filed on May 20, 2016, which issued as U.S. Pat. No. 10,396,360. The entire disclosure of the above application is incorporated herein by reference.

FIELD

The present disclosure relates to electrode materials for electrochemical devices, and more particularly to high performance silicon-containing or tin-containing electrodes having polymeric ultrathin conformal coatings for lithium ion electrochemical devices and methods for making such electrodes having polymeric ultrathin conformal coatings, including by layer-by-layer polymerization process with vapor precursors.

BACKGROUND

This section provides background information related to the present disclosure which is not necessarily prior art.

High-energy density, electrochemical cells, such as lithium ion batteries and lithium sulfur batteries can be used in a variety of consumer products and vehicles, such as Hybrid Electric Vehicles (HEVs) and Electric Vehicles (EVs). Typical lithium ion and lithium sulfur batteries comprise a first electrode (e.g., a cathode), a second electrode (e.g., an anode), an electrolyte material, and a separator. Often a stack of battery cells are electrically connected to increase overall output. Conventional lithium ion and lithium sulfur batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery.

Contact of the anode and cathode materials with the electrolyte can create an electrical potential between the electrodes. When electron current is generated in an external circuit between the electrodes, the potential is sustained by electrochemical reactions within the cells of the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

Typical electrochemically active materials for forming an anode include lithium-graphite intercalation compounds, lithium-silicon alloying compounds, lithium-tin alloying compounds, lithium alloys. While graphite compounds are most common, recently, anode materials with high specific capacity (in comparison with conventional graphite) are of growing interest. For example, silicon has the highest known theoretical charge capacity for lithium, making it one of the most promising materials for rechargeable lithium ion batteries. However, current anode materials comprising silicon suffer from significant drawbacks. The large volume changes (e.g., volume expansion/contraction) of silicon-containing materials during lithium cycling (e.g., lithium alloying or dealloying) results in cracking of the anode, a decline of electrochemical cyclic performance and diminished Coulombic charge capacity (capacity fade), and limited cycle life.

It would be desirable to develop high performance negative electrode materials comprising silicon or other negative-electrode materials that expand during lithium cycling for use in high power lithium ion batteries, which overcome the current shortcomings that prevent their widespread commercial use, especially in vehicle applications. For long term and effective use, anode materials containing silicon should be capable of minimal capacity fade and maximized charge capacity for long-term use in lithium ion batteries.

SUMMARY

This section provides a general summary of the disclosure, and is not a comprehensive disclosure of its full scope or all of its features.

In certain aspects, a negative electrode material for a lithium-ion electrochemical cell is provided. The negative electrode material may comprise a polymeric ultrathin conformal coating formed on a surface of a negative electroactive material. In certain aspects, the negative electroactive material may be selected from the group consisting of: silicon, silicon-containing alloys, tin-containing alloys, and combinations thereof. The coating has a thickness of less than or equal to about 50 nm. The coating may be flexible and thus capable of reversibly elongating by at least 50% from a contracted state to an expanded state in at least one direction to minimize or prevent fracturing of the negative electroactive material during lithium ion cycling.

In other aspects, the present disclosure provides a method of making a negative electrode for an electrochemical cell. The method comprises polymerizing one or more precursors on a surface of a negative electroactive material. The negative electroactive material may be selected from the group consisting of: silicon, silicon-containing alloys, tin-containing alloys, and combinations thereof. The polymerizing forms a polymeric ultrathin conformal coating having a thickness of less than or equal to about 50 nm. The coating may be flexible and capable of reversibly elongating at least 50% from a contracted state to an expanded state in at least one direction to minimize or prevent fracturing of the negative electroactive material during lithium ion cycling. The polymerizing occurs by a process selected from the group consisting of: layer-by-layer polymerization, anionic polymerization, cationic polymerization, and radical polymerization.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
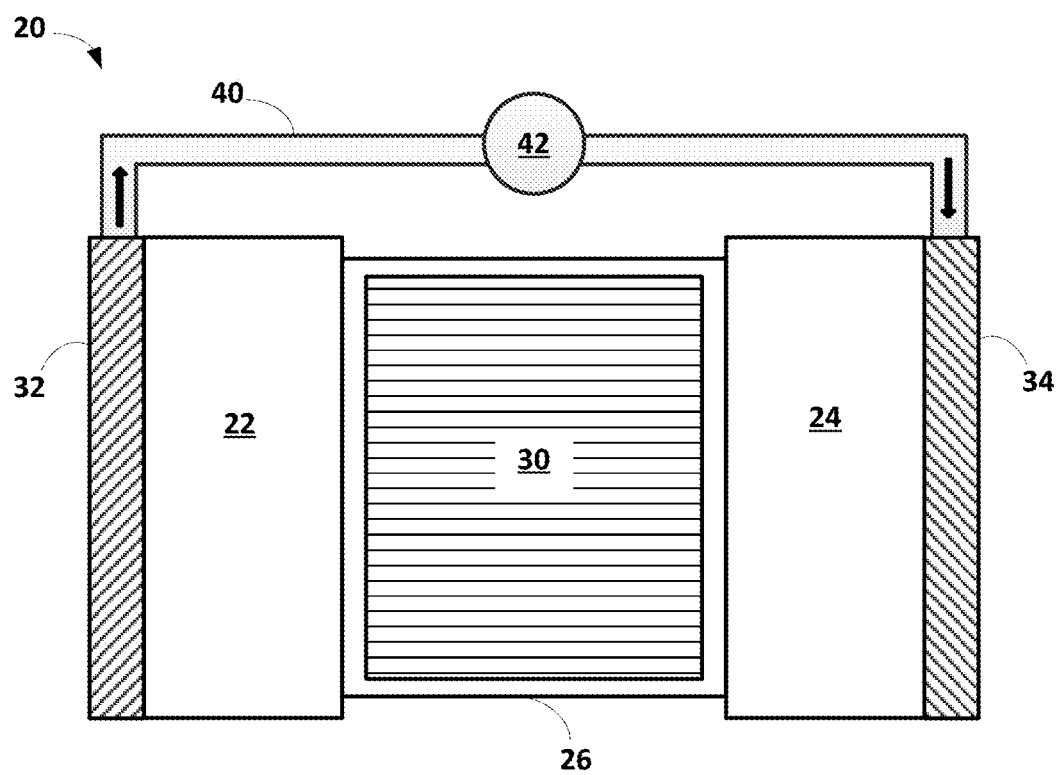
FIG. 1 is a schematic of an exemplary electrochemical battery cell.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of" the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to improved electrochemical cells, including batteries, especially lithium ion batteries and lithium sulfur batteries that may be used in vehicle applications. An exemplary and schematic illustration of a battery 20 is shown in FIG. 1. The battery may be a lithium ion electrochemical cell or a lithium sulfur electrochemical cell. The battery 20 includes a negative electrode 22, a positive electrode 24, and a separator 26 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the battery 20.

The battery 20 can generate an electric current during discharge by way of reversible electrochemical reactions that occur when the external circuit 40 is closed (to connect the negative electrode 22 and the positive electrode 34) when the negative electrode 22 contains a relatively greater quantity of intercalated/diffused lithium. The chemical potential difference between the positive electrode 24 and the negative electrode 22 drives electrons produced by the oxidation of intercalated/diffused lithium at the negative electrode 22 through the external circuit 40 toward the positive electrode 24. Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 18 can be harnessed and directed through the load device 42 until the intercalated/diffused lithium in the negative electrode 22 is depleted and the capacity of the battery 20 is diminished.

The battery 20 can be charged or re-powered at any time by connecting an external power source to the lithium ion battery 20 to reverse the electrochemical reactions that occur during battery discharge. The connection of an external power source to the battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with intercalated/diffused lithium for consumption during the next battery discharge cycle. The external power source that may be used to charge the battery 20 may vary depending on the size, construction, and particular end-use of the battery 20. Some notable and exemplary external power sources include, but are not limited to, an AC wall outlet and a motor vehicle alternator. In many lithium ion battery and lithium sulfur battery configurations, each of the negative current collector 32, negative electrode 22, the separator 26, positive electrode 24, and positive current collector 34 are prepared as relatively thin layers (for example, several micrometers or a millimeter or less in thickness) and assembled in layers connected in electrical parallel arrangement to provide a suitable energy package.

Furthermore, the battery 20 can include a variety of other components that while not depicted here are nonetheless known to those of skill in the art. For instance, the lithium ion battery 20 may include a casing, gaskets, terminal caps, and any other conventional components or materials that may be situated within the battery 20, including between or around the negative electrode 22, the positive electrode 24, and/or the separator 26, by way of non-limiting example. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium ion cells or batteries to produce a greater voltage output and power density if it is required by the load device 42.

Accordingly, the battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the battery 20 for purposes of storing energy.

Any appropriate electrolyte 30, whether in solid form or solution, capable of conducting lithium ions between the negative electrode 22 and the positive electrode 24 may be used in the lithium ion battery 20. In certain aspects, the electrolyte solution may be a non-aqueous liquid electrolyte solution that includes a lithium salt dissolved in an organic solvent or a mixture of organic solvents. Numerous conventional non-aqueous liquid electrolyte 30 solutions may be employed in the lithium ion battery 20. A non-limiting list of lithium salts that may be dissolved in an organic solvent to form the non-aqueous liquid electrolyte solution include $LiPF_6$, $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, and combinations thereof. These and other similar lithium salts may be dissolved in a variety of organic solvents, including but not limited to various alkyl carbonates, such as cyclic carbonates (ethylene carbonate (EC), propylene carbonate (PC), butylene carbonate(BC)), acyclic carbonates (dimethyl carbonate (DMC), diethyl carbonate (DEC), ethylmethylcarbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The separator 26 may comprise, in one embodiment, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also comprise other polymers in addition to the polyolefin such as, but not limited to, polyethylene terephthalate (PET), polyvinylidene fluoride (PVDF), cellulose, and/or a polyamide. The polyolefin layer, and any other optional polymer layers, may further be included in the microporous polymer separator 26 as a fibrous layer to help provide the microporous polymer separator 26 with appropriate structural and porosity characteristics. Various conventionally available polymers and commercial products for forming the separator 26 are contemplated, as well as the many manufacturing methods that may be employed to produce such a microporous polymer separator 26.

In a lithium ion battery, the positive electrode 24 may be formed from a lithium-based active material that can sufficiently undergo lithium intercalation and deintercalation while functioning as the positive terminal of the lithium ion battery 20. The positive electrode 24 may include a polymeric binder material to structurally fortify the lithium-based active material. One exemplary common class of known materials that can be used to form the positive electrode 24 is layered lithium transitional metal oxides. For example, in certain embodiments, the positive electrode 24 may comprise at least one spinel comprising a transition metal like lithium manganese oxide ($Li_{(1+x)}Mn_{(2-x)}O_4$), where $0 \leq x \leq 1$, where x is typically less than 0.15, including $LiMn_2O_4$, lithium manganese nickel oxide ($LiMn_{(2-x)}Ni_xO_4$), where $0 \leq x \leq 1$ (e.g., $LiMn_{1.5}Ni_{0.5}O_4$), lithium cobalt oxide ($LiCoO_2$), lithium manganese oxide ($LiMn_2O_4$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $y<1$, and M may be Al, Mn, or the like, other known lithium-transition metal oxides or mixed oxides lithium iron phosphates, or a lithium iron polyanion oxide such as lithium iron phosphate ($LiFePO_4$) or lithium iron fluorophosphate ($Li_2FePO_4F$). Such active materials may be intermingled with at least one polymeric binder, for example, by slurry casting active materials with such binders, like polyvinylidene fluoride (PVDF), ethylene propylene diene monomer (EPDM) rubber, or carboxymethoxyl cellulose (CMC). The positive current collector 34 may be formed from aluminum or any other appropriate electrically conductive material known to those of skill in the art.

In a lithium sulfur battery, the positive electrode includes sulfur-based compounds for a positive active material. A sulfur-based compound may be selected from at least one of: elemental sulfur, $Li_2S_n$ (wherein n greater than or equal to 1), $Li_2S_n$ (wherein n greater than or equal to 1) dissolved in a catholyte, an organosulfur compound, and a carbon-sulfur polymer (($C_2S_x)_n$: wherein x=2.5, and n is 2 or greater). The positive electrode may also include electrically conductive materials that facilitate the movement of the electrons within the positive electrode. For example, electrically conductive materials may include graphite, carbon-based materials, or a conductive polymer. Carbon-based materials may include by way of non-limiting example Ketchen black, Denka black, acetylene black, carbon, black, and the like. Examples of a conductive polymer include polyaniline, polythiophene, polyacetylene, polypyrrole, and the like. The conductive material may be used alone or as a mixture of two or more materials. The positive electrode may also include a polymeric binder as described above.

In certain aspects, the present disclosure provides improved negative electrodes (e.g., anode). The electrochemically active negative electrode material may be selected from the group consisting of: silicon, silicon-containing alloys, tin-containing alloys, and combinations thereof. By way of example, particles comprising silicon may include silicon, or silicon containing binary and ternary alloys and/or tin-containing alloys, such as Si—Sn, SiSnFe, SiSnAl, SiFeCo, $SnO_2$, and the like. Such negative electrode materials suffer from significant volumetric expansion during lithium cycling (e.g., capable of accepting the insertion of lithium ions during charging of the electrochemical cell "intercalation" and releasing lithium ions during discharging of the electrochemical cell "deintercalation" or lithium alloying/dealloying).

Figure 2:
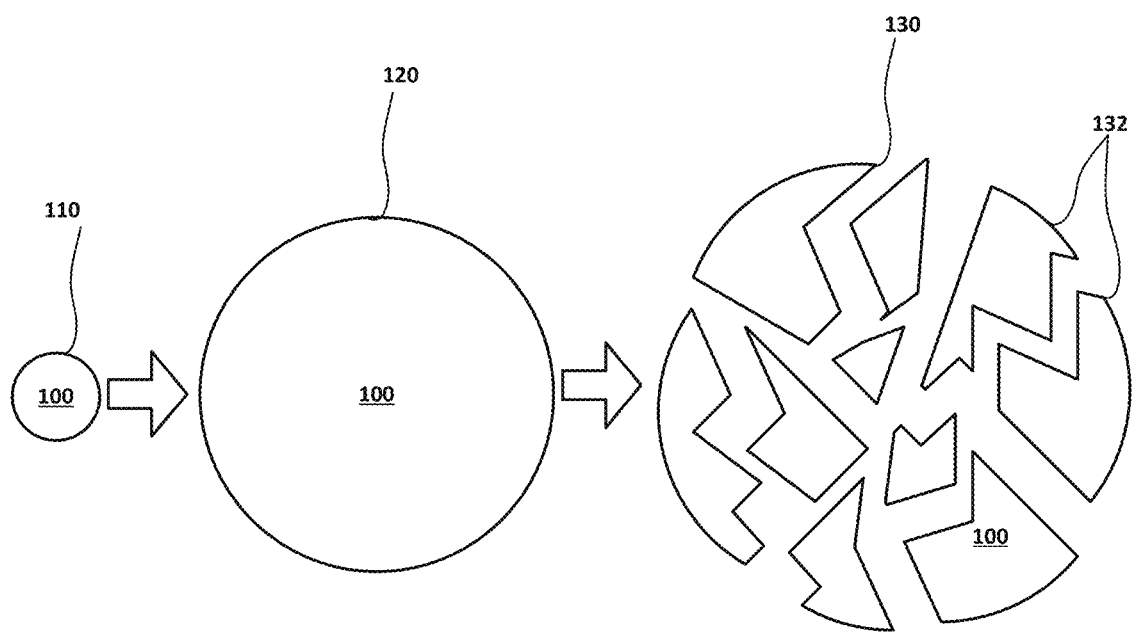
FIG. 2 is a schematic showing volumetric expansion of an electroactive material comprising silicon during lithium ion intercalation/alloying.

For example, as shown in FIG. 2, a particle 100 comprising a silicon-containing material undergoes a significant volume expansion during lithium ion intercalation or lithium alloying. In an initial state 110 prior to lithium ion insertion or reaction, the particle 100 is in a first contracted state. After lithium ion insertion/intercalation or alloying, the particle 100 is in a second expanded state 120. For example, where the particle is a silicon particle (Si) in the first contracted state 110, after lithium ion insertion it forms $Li_{4.4}Si$ (corresponding to the second expanded state 120). The volume of a silicon particle 100 after lithium insertion in the second expanded state 120 may be up to four (4) times (400%) larger than the volume of silicon particle 100 in the first contracted state 110. As will be appreciated, the first contracted state 110 may correspond to the volume of the particle 100 before lithium insertion or after lithium extraction. In a conventional system like that shown in FIG. 2, the extent of volumetric expansion that occurs can cause the particle 100 to transition into a third state 130 where the particle 100 mechanically degrades and breaks into a plurality of smaller fragments or pieces 132. When the particle 100 breaks into smaller pieces 132 in the third state 130, these fragments or smaller pieces 132 can no longer maintain performance of the electrochemical cell. Thus, it is desirable to avoid the fragmentation and breakage associated with the third state 130.

Figure 3:
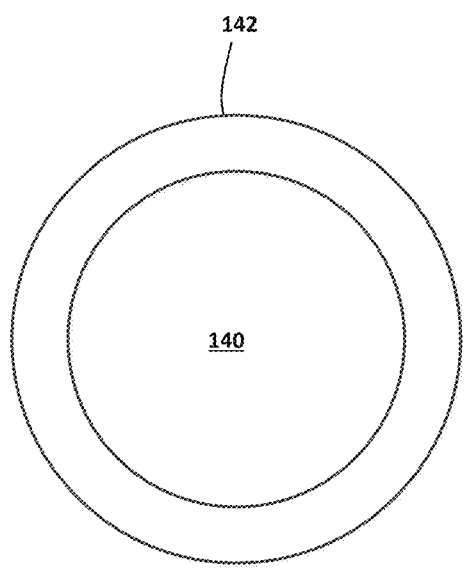
FIG. 3 is a schematic showing an electrode material in an electrochemical cell comprises an ultrathin conformal coating prepared in accordance with certain aspects of the present disclosure that is capable of minimizing or preventing fracturing of the electrode material during lithium ion cycling.

In accordance with various aspects of the present teachings, an electrode material in an electrochemical cell comprises an ultrathin conformal coating that is capable of minimizing or preventing fracturing of the negative electrode material during lithium ion cycling. For example, as shown in FIG. 3, an electrode material particle 140 has an ultrathin polymeric flexible conformal coating 142 disposed thereon. The coating is polymeric, thus comprising at least one polymer or oligomer including a siloxane unit (e.g., —SiO—) and/or an organic unit (e.g., —CH$_n$—). In certain variations, the polymer comprises silicon, for example, a siloxane unit. It should be noted that the features in FIG. 3 are not necessarily shown to scale, but rather are merely provided for purposes of illustration.

The ultrathin conformal coating is applied to exposed regions of a surface of the electrode material, meaning that it is thin but extensively covers the exposed regions of the surface of the material. In certain variations, the polymeric ultrathin conformal coating is disposed on greater than or equal to about 50% of the exposed surface area of the negative electrode material, optionally on greater than or equal to about 75% of the exposed surface area, optionally on greater than or equal to about 90% of the exposed surface area, optionally on greater than or equal to about 95% of the exposed surface area, optionally on greater than or equal to about 97% of the exposed surface area, optionally on greater than or equal to about 98% of the exposed surface area, optionally on greater than or equal to about 99% of the exposed surface area, optionally on greater than or equal to about 99.5% of the exposed surface area, and in certain aspects, 100% of the exposed surface area of the negative electrode material of the negative electrode material is coated with the polymeric ultrathin conformal coating.

In certain preferred aspects, a surface of a negative electrode material comprising silicon and/or tin has an ultrathin conformal surface coating that is flexible and minimizes or prevents fracturing of the negative electrode material during lithium ion cycling in the electrochemical cell. If minor degradation of the active electrode material occurs, the flexible polymer coating can assist in maintaining the structural integrity of the electrode. In certain variations, an average thickness of the surface coating on the negative electrode material is ultrathin and thus has an average thickness of less than or equal to about 50 nm, optionally less than or equal to about 35 nm, optionally less than or equal to about 30 nm, optionally less than or equal to about 25 nm, optionally less than or equal to about 20 nm, optionally less than or equal to about 15 nm, optionally less than or equal to about 10 nm, optionally less than or equal to about 9 nm, optionally less than or equal to about 8 nm, optionally less than or equal to about 7 nm, and optionally less than or equal to about 6 nm. In certain variations, an ultrathin coating is greater than or equal to about 5 nm to less than or equal to about 50 nm.

In certain variations, a thickness of the ultrathin conformal surface coating only deviates across the surface of the electroactive material a maximum amount of less than or equal to about 100% (a difference in thickness from the thinnest portion of the coating to the thickest portion of the coating is ≤100%). In this manner, the thickness of the coating is relatively uniform and maintains coverage over the surface of the electrode material in the expanded state, as well as in the contracted state. The ultrathin conformal surface coating provides sufficient coverage of the exposed surface regions to maintain and keep the negative electrode material that undergoes high volumetric expansion intact without fracturing and diminishing performance in the electrochemical cell, while maintaining lithium ion diffusion levels and minimizing electrical impedance at the electroactive material surface to increase electrode integrity.

In certain aspects, the polymeric ultrathin conformal coating is flexible and thus capable of reversibly elongating by at least 50% from a contracted state to an expanded state in at least one direction to minimize or prevent fracturing of the negative electrode material or holding the fractured electrode particles together to maintain both ionic and electrical conductivity during lithium ion cycling. In certain variations, a modulus of elasticity of the polymeric ultrathin conformal coating may be less than or equal to about 2 GPa when the coating is saturated with liquid electrolyte, and in certain preferred variations, less than or equal to about 1 GPa. By reversibly elongating in at least one direction, it is meant that the polymeric conformal coating can expand and contract in at least one direction from an initial point (e.g., initial length $L_i$) to an expanded point (e.g., expanded length $L_e$) and return to or at least near to the initial point without mechanical fracture or failure. Thus, an elongation of at least 50% means that $L_e$–$L_i$/$L_i$≥50%, so that in an example where an initial average thickness of the ultrathin conformal coating corresponds to an Li of 5 nm, 50% elongation would amount to an expanded length $L_e$ of about 7.5 nm. In this manner, the flexible polymeric ultrathin conformal coating provides the ability to expand and contract with the electrode active material during lithium cycling. Depending on the electroactive material used, the ultrathin conformal coating may be capable of reversibly elongating by at least 75% from a contracted state to an expanded state in at least one direction, optionally by at least 100% from a contracted state to an expanded state in at least one direction, optionally by at least 125% from a contracted state to an expanded state in at least one direction, optionally by at least 150%, optionally by at least 175%, and in certain variations up to or exceeding 200% elongation from a contracted state to an expanded state in at least one direction to minimize or prevent fracturing of the negative electrode material during lithium ion cycling. The ultrathin conformal coating polymeric desirably has a lithium ion conductivity or diffusion rate that is greater than that of the electrode material, for example, greater than $10^{-12}$ to $10^{-14}$ cm$^2$/s.

In certain variations, the average particle diameter of the negative electrode active material may be greater than or equal to about 5 nanometers to less than or equal to about 200 nanometers. As noted above, the present technology is particularly suitable for use with negative electroactive materials for the negative electrode 22 that are selected from the group consisting of: silicon, silicon-containing alloys, tin-containing alloys, and combinations thereof. Materials that can be used to form the negative electrode 22 include, for example, lithium-silicon and silicon containing binary and ternary alloys and/or tin-containing alloys, such as Si—Sn, SiSnFe, SiSnAl, SiFeCo, SnO$_2$, and the like. Negative electrodes may comprise greater than or equal to about 50% to less than or equal to about 90% of an electroactive material (e.g., silicon-containing or tin-containing particles), optionally greater than or equal to about 5% to less than or equal to about 30% of an electrically conductive material, and a balance binder. Suitable electrically conductive materials may be selected from graphite particles, carbon black, powdered nickel, metal particles, conductive polymers, and combinations thereof. Useful binders may comprise a polymeric material and extractable plasticizer suitable for forming a bound porous composite, such as halogenated hydrocarbon polymers (such as poly(vinylidene chloride) and poly((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, CMC (carboxyl methyl cellulose) and mixtures thereof. The negative electrode current collector 32 may be formed from copper or any other appropriate electrically conductive material known to those of skill in the art.

An electrode may be made by mixing the electrode active material, such as silicon-containing particles having a polymeric ultrathin conformal coating, into a slurry with a polymeric binder compound, a non-aqueous solvent, optionally a plasticizer, and optionally if necessary, electrically conductive particles. The slurry can be mixed or agitated, and then thinly applied to a substrate via a doctor blade. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the electrode film that is then further laminated to a current collector. With either type of substrate it may be necessary to extract or remove the remaining plasticizer prior to incorporation into the battery cell.

In certain preferred variations, pre-fabricated electrodes formed of silicon-containing particles via the active material slurry casting described above can be directly coated via a coating formation process, such as in atomic layer deposition (ALD), or physical vapor deposition, or chemical vapor infiltration. Thus, one or more exposed regions of the pre-fabricated negative electrodes comprising the electroactive material particles can be coated on the surfaces of negative electrode materials when incorporated into the electrochemical cell. In other variations, a plurality of particles comprising an electroactive material can be coated with a polymeric ultrathin conformal coating. Then, the coated particles can be used in the active material slurry to form the negative electrode, as described above.

A battery may thus be assembled in a laminated cell structure, comprising an anode layer, a cathode layer, and electrolyte/separator between the anode and cathode layers. The anode and cathode layers each comprise a current collector. A negative anode current collector may be a copper collector foil, which may be in the form of an open mesh grid or a thin film. The current collector can be connected to an external current collector tab.

For example, in certain variations, an electrode membrane, such as an anode membrane, comprises the electrode active material (e.g., silicon) dispersed in a polymeric binder matrix over a current collector. The separator can then be positioned over the negative electrode element, which is covered with a positive electrode membrane comprising a composition of a finely divided lithium insertion compound in a polymeric binder matrix. A positive current collector, such as aluminum collector foil or grid completes the assembly. Tabs of the current collector elements form respective terminals for the battery. A protective bagging material covers the cell and prevents infiltration of air and moisture. Into this bag, an electrolyte is injected into the separator (and may also be imbibed into the positive and/or negative electrodes) suitable for lithium ion transport. In certain aspects, the laminated battery is further hermetically sealed prior to use.

Thus, in certain variations, the present disclosure provides an electroactive material, which may be used in an electrochemical cell, such as a lithium-ion battery. A negative electrode material may comprise silicon, silicon alloys, tin, and their alloys, for example. In certain variations, the negative electrode material comprises silicon. The electrode material has a polymeric ultrathin conformal surface coating formed thereon, which may have a thickness of less than or equal to about 50 nm and is capable of reversibly elongating by at least 50% from a contracted state to an expanded state in at least one direction to minimize or prevent fracturing of the negative electrode material during lithium ion cycling within the electrochemical cell. In certain variations, the electroactive material comprising silicon, silicon alloys, tin, and their alloys is contained in a pre-fabricated electrode layer and the polymeric ultrathin conformal coating is applied to at least one surface of the pre-fabricated electrode layer. In other variations, the polymeric ultrathin conformal coating is applied to a plurality of particles comprising silicon, silicon alloys, tin, and their alloys, which can then subsequently be incorporated into the electrode. In certain preferred aspects, the polymeric coating comprises silicon, for example, a siloxane or siloxane copolymer. In certain aspects, the polymeric ultrathin conformal coating is ultrathin and formed in an atomic layer deposition process.

In other aspects, the present disclosure provides a method of making a negative electrode for an electrochemical cell that includes a polymerizing process, where one or more precursors are reacted on a surface of a negative electrode material selected from the group consisting of: silicon, silicon-containing alloys, tin-containing alloys, and combinations thereof. The precursor may be an initiator or a monomer in certain variations. The polymerizing forms a polymeric ultrathin conformal coating as described above. The polymerizing may occur by a process selected from the group consisting of: layer-by-layer polymerization, which may be conducted as vapor reactants via atomic layer deposition, anionic polymerization, cationic polymerization, and radical polymerization. The polymerizing may be conducted in a process selected from the group consisting of: atomic layer deposition (ALD), physical vapor deposition (PVD), chemical vapor deposition (CVD), molecular layer deposition (MLD), layer by layer deposition (LBL), chemical vapor infiltration, and wet chemistry.

In one variation, the polymerizing process comprises a layer-by-layer polymerization. In certain aspects, the layer-by-layer process may occur in an atomic layer deposition (ALD) reactor, where a first gaseous precursor (e.g., an alkyl lithium like lithium tert-butoxide-LiO$^t$Bu) and a second gaseous precursor (e.g., a linear or cyclic siloxane) are sequentially introduced to the reactor. The linear or cyclic siloxanes may include linear siloxane polymers [—SiRR'O—] (with various alkyl and aryl R and R' side groups), silsesquioxanes polymers, silalkylene polymers [—Si(CH$_3$)$_2$(CH$_2$)$_m$—], and any copolymers of the above.

In one example, the second gaseous precursor may be a cyclic methyl siloxane. Trimethylaluminum (TMA) may also be used as a precursor. With alkyl lithium as an initiator, the cyclic siloxane or linear siloxanes can be polymerized into the polymer coating in situ on the particles or any other substrates for a variety of applications.

In certain variations, a suitable gaseous polymerization/deposition process for layer-by-layer polymerization includes atomic layer deposition (ALD), where first the first gaseous precursor is applied to the surface of the negative electrode material. In any of the methods described herein, the negative electrode material desirably has at least 1% of the exposed surface area with active hydrogen or hydroxyl groups. This amount of active groups on the surface helps to ensure surface coverage levels with the polymeric coating discussed previously above, for example, greater than 90% of the exposed surface area being covered by the polymeric coating. If necessary, the surface of the electrode active material can be activated prior to polymerization by conventional methods known in the art, for example, by plasma treatment, oxidation, or other chemical treatment. Thus, in this polymerization process, the polymeric ultrathin conformal surface coating is built up layer-by-layer so that the first gaseous precursor is initially reacted with the active groups on the surface of the negative electrode material.

In one exemplary process, the deposition temperature for the substrate may be about 80° C. The heating temperature for precursors trimethylaluminum (TMA) and cyclic methyl siloxane may also be around 80° C., and the heating temperature for precursor lithium tert-butoxide is around 160° C. A flow rate of the carry gas (Ar) is around 20 SCCM. For each precursor, the initial purge time is around 0.015 seconds, the exposure time is approximately 20 seconds, and the purge time is approximately 20 seconds. All the precursors are alternatively input the deposition chamber; each precursor goes through purge-expose-pump, which leads to one cycle. In one cycle, a thickness of the polymer coating is around 0.15 nm. The coating thickness is controlled by the number of cycles used, where thicker coatings may be formed by increasing the number of cycles conducted. The polymeric ultrathin conformal coating thus formed comprises a siloxane polymer.

In other variations, the polymerizing process comprises a radical polymerization process. The precursors may include an initiator and a monomer. While the precursors can be in either gas/vapor or liquid states, in most cases, the precursors are in a vapor or gas state because of the temperatures to which they are heated and that the carry gas (e.g., Ar) brings them into the reactor. In certain variations, the initiator is selected from the group consisting of: azoisobutylnitrile, dicumyl peroxide, persulfate, and combinations thereof. The monomer may comprise an acrylate monomer or a methacrylate monomer. In certain variations, the monomer may be 4-Methacryloyloxy-2,2,6,6-tetramethylpiperidine-1-oxy (TEMPO methacrylate, which forms a semiconducting polymer). Such a radical polymerization process is conducted in an oxygen-free and water-free environment. For example, the radical polymerization process may be conducted in an inert gas environment (e.g., nitrogen, argon). The initiator, monomer, and the active particles are blended together and reacted at suitable temperatures to achieve the coating layer on the particle surface. Thus, in certain variations, the polymeric ultrathin conformal coating formed comprises a semi-conductive methacrylate polymer.

In yet other variations, the polymerizing process comprises anionic polymerization. The precursors may include an initiator and a monomer. While the precursors can be in either gas/vapor or liquid states, in most cases, the precursors are in a vapor or gas state because of the temperatures to which they are heated and that the carry gas (e.g., Ar) brings them into the reactor. In certain variations, the initiator is selected from the group consisting of: Grignard reagents, metal alkoxides, amides, cyanides, and combinations thereof. Suitable examples of such initiators may include sec-Butyl lithium, diphenyl methyl Na, and $NaNH_2$. The monomer may be selected from the group consisting of: vinyl pyridine, cyclic siloxane, cyanoacrylate, propylene oxide, vinyl silane, and combinations thereof. Suitable examples of such monomers may include vinyl pyridine, cyclic siloxane with various alkyl and aryl groups, such as methyl, ethyl, phenyl, and the like. Such an anionic polymerization process may be conducted in an oxygen-free and water-free environment. For example, the anionic polymerization process may be conducted in an inert gas environment (e.g., nitrogen, argon). Thus, in certain variations, the polymeric ultrathin conformal coating formed comprises a polymer selected from the group consisting of: vinyl pyridine, cyclic dimethyl siloxane, and combinations thereof.

In yet further variations, the polymerizing process may comprise cationic polymerization. The precursors may include an initiator and a monomer. While the precursors can be in either gas/vapor or liquid states, in most cases, the precursors are in a vapor or gas state because of the temperatures to which they are heated and that the carry gas (e.g., Ar) brings them into the reactor. In certain variations, the initiator is a protonic acid. Suitable examples of such an initiator may include phosphoric, sulfuric, fluoro-, and triflic (trifluoromethanesulfonic) acids. Other initiators may be Lewis acids, such as $SnCl_4$, $AlCl_3$, $BF_3$, and $TiCl_4$. The monomer may be selected from the group consisting of: lactones, lactams, and combinations thereof. Suitable examples of such monomers may include oxirane, oxazoline, and tetrahydrofuran. Such a cationic polymerization process may be conducted in an oxygen-free and water-free environment. For example, the radical polymerization process may be conducted in an inert gas environment (e.g., nitrogen, argon). Thus, in certain variations, the polymeric ultrathin conformal coating formed comprises a polymer such as polycaprolactam (or nylon) or polyethylene oxide.

Example 1

Samples are prepared for purposes of comparison. Sample A is prepared in accordance with certain aspects of the present teachings and includes a silicon anode material having a linear and cyclic siloxane coating deposited on the silicon particles by ALD. For Sample A, the silicon electrode material is coated with linear and cyclic siloxane applied via an atomic layer deposition aqueous process. The precursors include a cyclic methyl siloxane, lithium tert-butoxide, and trimethylaluminum (TMA). The deposition temperature for the substrate may be about 80° C. The heating temperature for precursors trimethylaluminum (TMA) and cyclic methyl siloxane may also be around 80° C., and the heating temperature for precursor lithium tert-butoxide is around 160° C. A flow rate of the carry gas (Ar) is around 20 SCCM. For each precursor, the initial purge time is around 0.015 seconds, the exposure time is approximately 20 seconds, and the purge time is approximately 20 seconds. All the precursors are alternatively input the deposition chamber, each precursor goes through purge-expose-pump, which leads to one cycle. A typical reaction for forming the coating is:

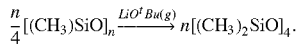

A siloxane layer having a thickness of about 0.15 nm is deposited in each cycle on electrode surfaces (half inch in diameter). The total thickness of the polymeric surface coating formed is 5 nm after 33 cycles.

Figure 4:
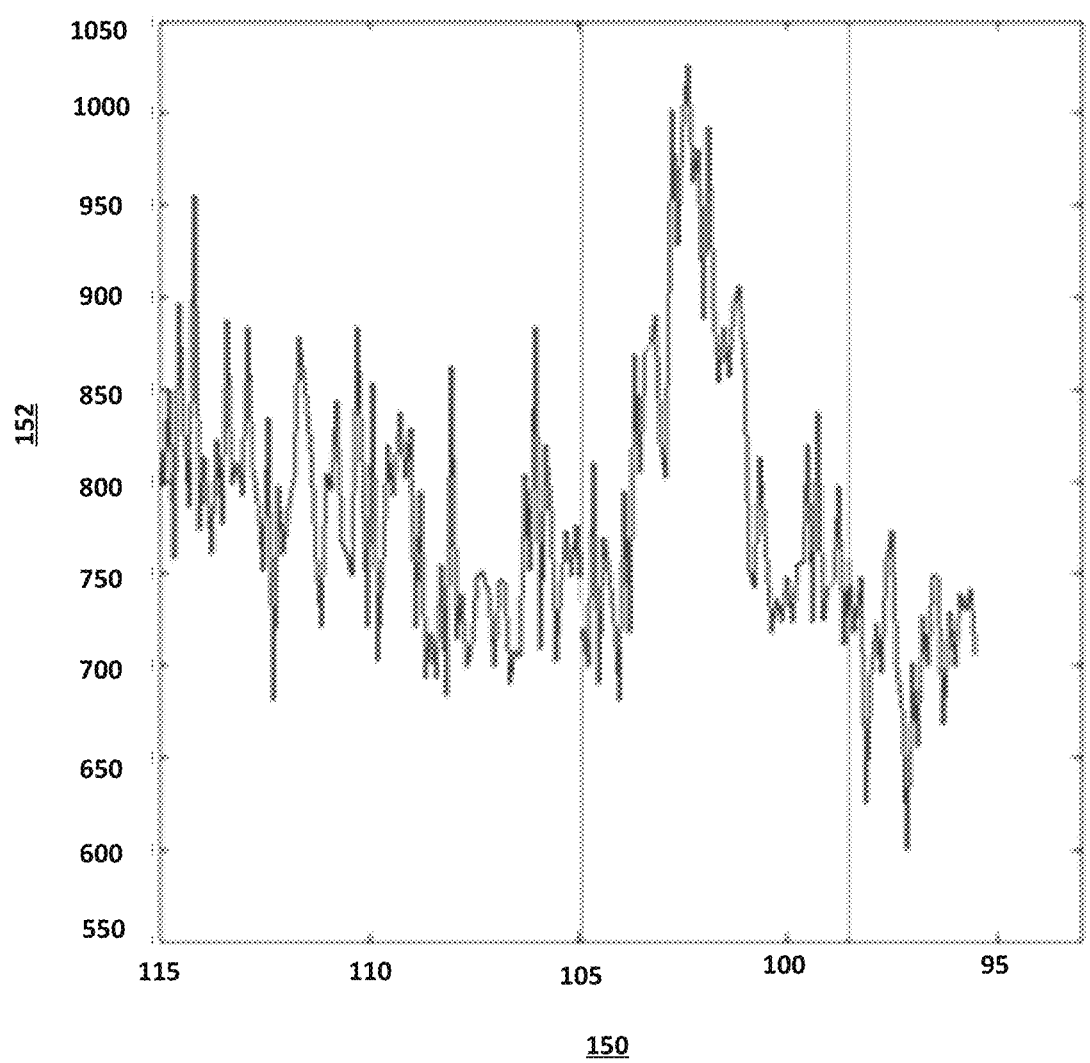
FIG. 4 shows X-Ray Photon Spectroscopy (XPS) of a polymeric ultrathin conformal coating comprising silicon deposited on a copper substrate.
Figure 5:
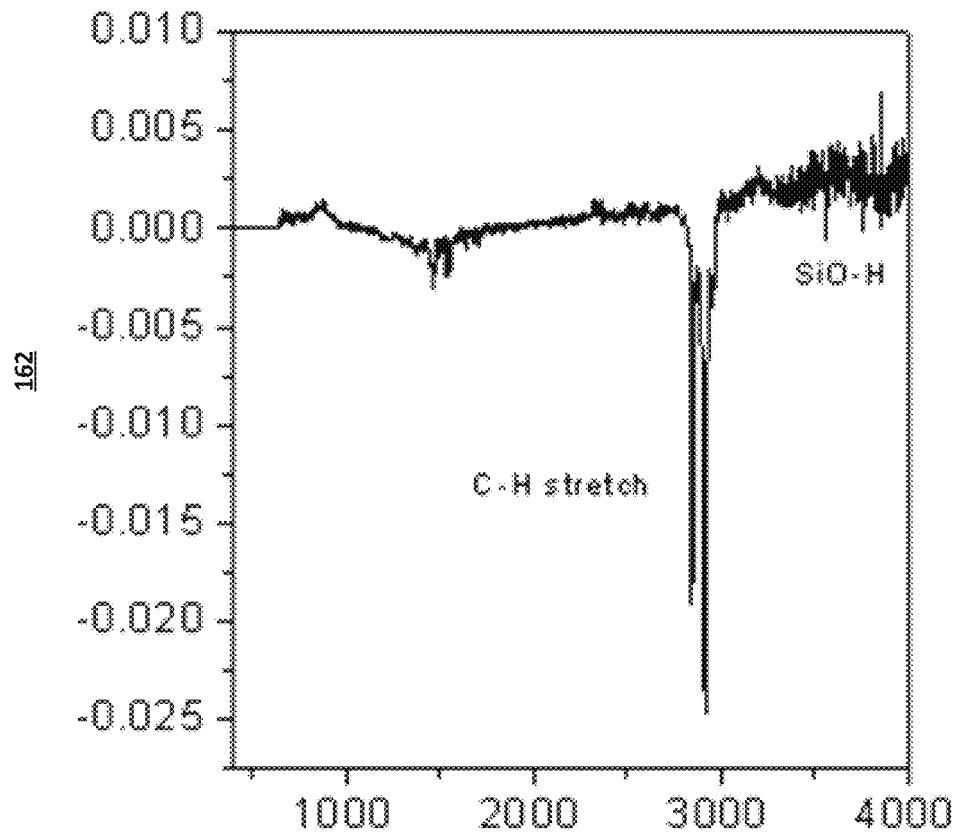
FIG. 5 shows infrared spectroscopy of an organic polymeric coating comprising a siloxane applied to a silicon surface.

Structural characterization of the polymeric siloxane coatings as formed are shown in FIGS. 4 and 5. XPS results in FIG. 4 show the Si-containing polymeric coating has been deposited on a copper substrate. X-axis (150) is binding energy (eV) while Y-axis (152) is c/s. The typical Si signal (a small peak around 103 ev) has been detected on Cu. FIG. 5 shows a siloxane coating containing Si—O and C—H bonds has been deposited on a silicon surface of the active material. X-axis (160) is wavenumber (cm$^{-1}$) while Y-axis (162) is absorption.

Example 2

Si thin-film electrodes (~100 nm) are prepared by RF magnetron sputtering on copper current collectors, and tested in coin cells for electrochemical characterization. Polymer coatings were prepared by ALD process described above in Example 1. A Control is a bare silicon (Si) anode material (incorporated into a negative electrode). Sample A is a silicon material having a polymeric ultrathin conformal coating deposited thereon via ALD (like the process described in Example 1) at a thickness of 5 nm. Sample B is a silicon material having a polymeric ultrathin conformal coating deposited thereon via ALD (like the process described in Example 1) at a thickness of 10 nm.

Battery half cells with silicon (either Control or Samples A-B) as the working electrodes and Li foil as counter electrode are used with an electrolyte comprising 1M LiPF$_6$ in 50% EC and 50% DEC and a separator. The Si electrodes (or polymer-coated Si electrodes) are used as working electrodes, and pure lithium metal foil as counter and reference electrodes in CR2032 coin cells. A separator (CELGARD™, USA) is placed between working electrode and lithium foil, and 1M LiPF$_6$ in ethylene carbonate and dimethyl carbonate (EC:DMC 1:1 volume ratio, BASF) is employed for the electrolyte. An uncoated portion of the electrode is connected to an external tab. The electrolyte and separator are disposed between the surfaces of respective positive and negative electrodes to form a full-cell battery. The Arbin battery test system (BT-2000) is used to cycle the coin cells, using the constant-current method (with a rate of C/3) and a voltage window between 0.05 V to 1.5 V. The EIS study is conducted in two-electrode coin cells at the assigned voltage. The coin cells are rested for 24 hours until they are stabilized.

Electrochemical measurements are performed with the constant current density of 10 mA/g$^{-1}$ (about C/10) based on the mass of the positive electrode in the working voltage window of 3 V to about 4.8 V for full cells. A cycle test of the battery is performed. Charge discharge cycles are repeated 20 times at ambient conditions.

Figure 6:
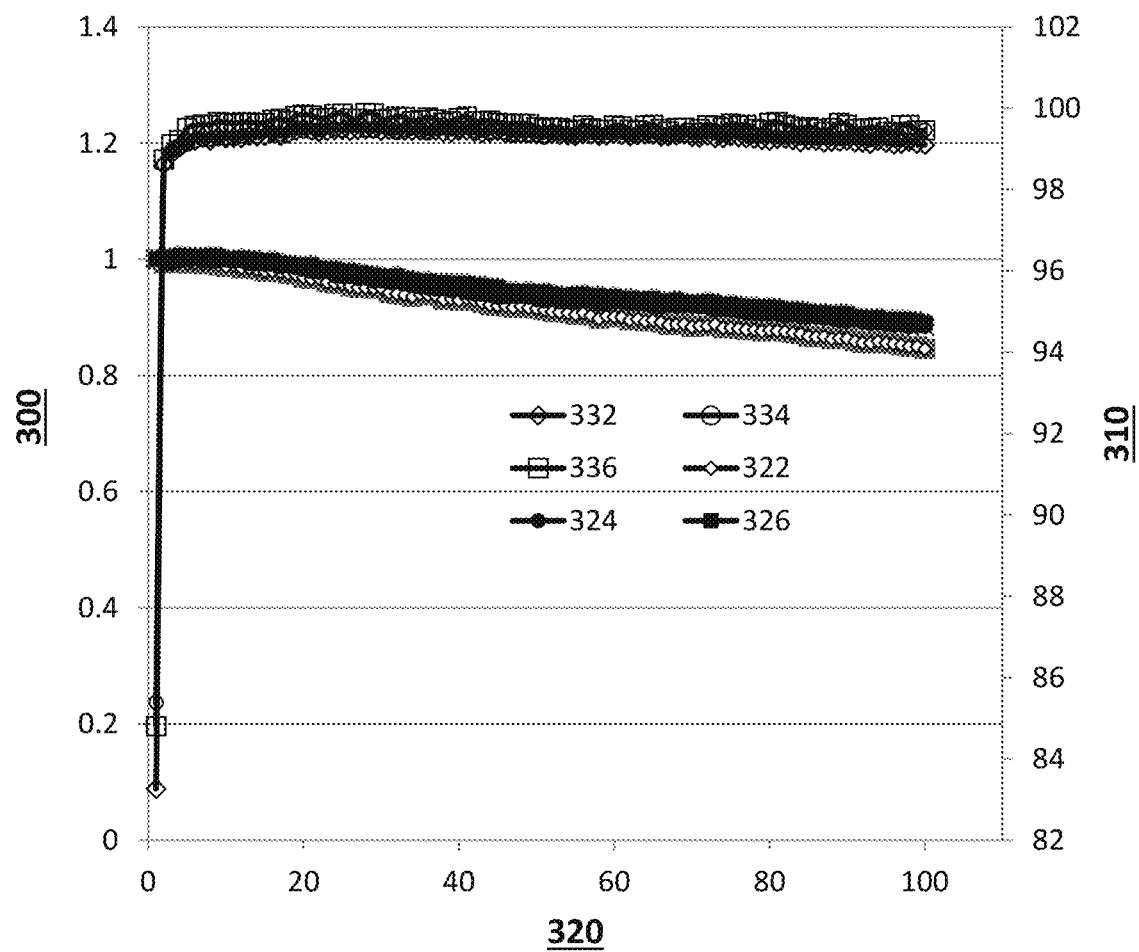
FIG. 6 shows comparative electrochemical performance for a control and two comparative samples prepared in accordance with certain aspects of the present disclosure having a polymeric ultrathin conformal coating on silicon at thicknesses of 5 nm and 10 nm.

The charging and discharging profiles of the electrochemical performance of the Control and Samples A-B are shown in FIG. 6. In FIG. 6, a left γ-axis shows capacity retention (300) which is in normalizes capacity starting with 1 unit, a right γ-axis shows cycle efficiency % (310), while cycle number is shown on the x-axis (320). A charge rate of C/10 is used and up to 20 cycles are tested. Charge capacity and discharge capacity are shown as solid data points (Control=322, Sample A=324, Sample B=326) while Coulombic efficiency (CE) are shown as open data points (Control=332, Sample A=334, Sample B=336).

Different coatings (e.g., Samples A and B) show different functionality. The polymeric coatings prepared in accordance with certain aspects of the present disclosure show improved cycle performance as well as coulombic efficiency. The coating thickness has an impact on the cell performance. Thus, the ideal thickness is believed to depend on factors including: the anode chemistry, particle size and coating chemistry. The polymeric ultrathin conformal coating improves the cycle efficiency and capacity retention. Thus, the polymeric coatings provide improved cycling stability of silicon anodes. It is believed that the conformal polymeric ultrathin conformal coating provides additional mechanical stability to the underlying electrode material to stabilize the negative electrode material during expansion and contraction.

In certain variations, a lithium ion battery incorporating an inventive electroactive material having a polymeric ultrathin conformal surface coating system for minimizing or preventing fracturing of the negative electrode material during lithium ion cycling can maintain charge capacity within 80% of an initial charge capacity for greater than or equal to about 500 hours of battery operation, optionally greater than or equal to about 1,000 hours of battery operation, optionally greater than or equal to about 1,500 hours of battery operation, and in certain aspects, greater than or equal to about 2,000 hours or longer of battery operation (active cycling).

In certain variations, the lithium ion battery incorporating an inventive electroactive material having a polymeric ultrathin conformal surface coating system for minimizing or preventing fracturing of the negative electrode material during lithium ion cycling is capable of maintaining charge capacity within 80% of an initial charge capacity for at least 1,000 deep discharge cycles, optionally greater than or equal to about 2,000 deep discharge cycles, optionally greater than or equal to about 3,000 deep discharge cycles, optionally greater than or equal to about 4,000 deep discharge cycles, and in certain variations, optionally greater than or equal to about 5,000 deep discharge cycles.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A negative electrode material for a lithium-ion electrochemical cell comprising:
   a flexible polymeric ultrathin conformal coating formed on a surface of a negative electroactive material, wherein the flexible polymeric ultrathin conformal coating comprises one or more materials selected from silicon, siloxane, polycaprolactam, polyethylene oxide, and TEMPO methacrylate and the flexible polymeric ultrathin conformal coating has a thickness of less than or equal to about 50 nm and is capable of reversibly elongating by at least 50% from a contracted state to an expanded state in at least one direction to minimize or prevent fracturing of the negative electroactive material during lithium ion cycling.

2. The electrode material of claim 1, wherein the flexible polymeric ultrathin conformal coating is disposed on greater than or equal to about 50% of exposed surface area of the negative electrode material.

3. The electrode material of claim 1, wherein the flexible polymeric ultrathin conformal coating is disposed on greater than or equal to about 99% of exposed surface area of the negative electrode material.

4. The electrode material of claim 1, wherein the thickness is greater than or equal to about 5 nm to less than or equal to about 50 nm.

5. The electrode material of claim 1, wherein the flexible polymeric ultrathin conformal coating comprises silicon.

6. The electrode material of claim 1, wherein the flexible polymeric ultrathin conformal coating comprises siloxane.

7. The electrode material of claim 1, wherein the flexible polymeric ultrathin conformal coating comprises a polycaprolactam or a polyethylene oxide.

8. The electrode material of claim 1, wherein the flexible polymeric ultrathin conformal coating comprises a TEMPO methacrylate.

9. The electrode material of claim 1, wherein the negative electroactive material is in the form of a plurality of particles and the flexible polymeric ultrathin conformal coating is applied to each respective particle in the plurality of particles.

10. A lithium-ion electrochemical cell comprising:
a negative electrode comprising a negative electroactive material having a flexible polymeric ultrathin conformal coating formed on a surface of the negative electroactive material, wherein the coating has a thickness of less than or equal to about 50 nm and is capable of reversibly elongating by at least 50% from a contracted state to an expanded state in at least one direction to minimize or prevent fracturing of the negative electrode during lithium ion cycling;
a positive electrode comprising a positive electroactive material comprising lithium;
a separator; and
an electrolyte, wherein the flexible polymeric ultrathin coating minimizes or prevents fracturing of the negative electrode material during lithium ion cycling to substantially maintain charge capacity of the lithium-ion electrochemical cell for greater than or equal to about 500 hours of operation.

11. The electrode material of claim 10, wherein the flexible polymeric ultrathin conformal coating has a modulus of elasticity of less than or equal to about 2 GPa when saturated with the electrolyte.

12. The lithium-ion electrochemical cell of claim 10, wherein the flexible polymeric ultrathin conformal coating is disposed on greater than or equal to about 50% of exposed surface area of the negative electrode material.

13. A method of making a negative electrode for an electrochemical cell, the method comprising:
polymerizing one or more precursors on a surface of a negative electroactive material to form a flexible polymeric ultrathin conformal coating having a thickness of less than or equal to about 50 nm that is capable of reversibly elongating at least 50% from a contracted state to an expanded state in at least one direction to minimize or prevent fracturing of the negative electroactive material during lithium ion cycling, wherein the flexible polymeric ultrathin conformal coating comprises one or more materials selected from silicon, siloxane, polycaprolactam, polyethylene oxide, and TEMPO methacrylate, and the polymerizing occurs by a process selected from the group consisting of: layer-by-layer polymerization, anionic polymerization, cationic polymerization, and radical polymerization.

14. The method of claim 13, wherein the one or more precursors are in a gas phase during the polymerizing.

15. The method of claim 13, wherein the polymerizing comprises layer-by-layer atomic layer deposition and the one or more precursors further comprises a first gaseous precursor of lithium tert-butoxide, a second gaseous precursor of a cyclic siloxane, and a third gaseous precursor of trimethylaluminum.

16. The method of claim 13, wherein the polymerizing comprises anionic polymerization and the one or more precursors further comprises an initiator and a monomer, wherein the initiator is selected from the group consisting of: Grignard reagents, metal alkoxides, amides, cyanides, and combinations thereof and the monomer is selected from the group consisting of: cyclic siloxane, vinyl silane, and combinations thereof.

17. The method of claim 13, wherein the polymerizing comprises cationic polymerization and the one or more precursors further comprises an initiator and a monomer, wherein the initiator comprises a protonic acid and the monomer is selected from the group consisting of: lactones, lactams, and combinations thereof.

18. The method of claim 13, wherein the polymerizing comprises radical polymerization and the one or more precursors further comprises an initiator and a monomer, wherein the initiator is selected from the group consisting of: azoisobutylnitrile, dicumyl peroxide, persulfate, and combinations thereof and the monomer comprises 4-Methacryloyloxy-2,2,6,6-tetramethylpiperidine-1-oxy.

19. The method of claim 13, wherein the polymerizing occurs in a process selected from the group consisting of: atomic layer deposition (ALD), physical vapor deposition (PVD), chemical vapor deposition (CVD), molecular layer deposition (MLD), layer by layer deposition (LBL), chemical vapor infiltration, and wet chemistry.

20. The method of claim 13, wherein the polymerizing occurs in an atomic layer deposition (ALD) process.

* * * * *